United States Patent [19]

Valat

[11] Patent Number: 4,489,500

[45] Date of Patent: Dec. 25, 1984

[54] ASSEMBLY, TESTING AND REPAIR UNIVERSAL STAND FOR MOTOR VEHICLES

[76] Inventor: Claude R. Valat, 139 Boulevard Murat, 75016 Paris, France

[21] Appl. No.: 515,814

[22] Filed: Jul. 21, 1983

Related U.S. Application Data

[62] Division of Ser. No. 227,093, Nov. 26, 1980, Pat. No. 4,447,961.

[30] Foreign Application Priority Data

Mar. 26, 1980 [WO] PCT Int'l Appl. ......... WO80/00045

[51] Int. Cl.³ .................. G01B 5/25; G01C 15/10
[52] U.S. Cl. ............................ 33/394; 33/174 R; 33/181 AT
[58] Field of Search ............... 33/392, 393, 394, 138, 33/139, 288, 174 R, 180 AT, 181 AT, 295

[56] References Cited

U.S. PATENT DOCUMENTS

| 792,944 | 6/1905 | Stow | 33/392 X |
|---|---|---|---|
| 1,069,593 | 8/1913 | Weaver et al. | 33/138 X |
| 1,577,133 | 3/1926 | Learnihan | 33/393 X |
| 2,784,498 | 3/1957 | Fleming | 33/393 X |
| 3,213,546 | 10/1965 | Ebbeson et al. | 33/394 |
| 4,319,402 | 3/1982 | Martin | 33/392 X |

FOREIGN PATENT DOCUMENTS 39350 1/1958 Poland .................. 33/394

Primary Examiner—Harry N. Haroian
Attorney, Agent, or Firm—Cushman, Darby & Cushman

[57] ABSTRACT

The present invention relates to a measuring device for the three-dimensional checking of a vehicle. The device includes a plumb bob device having a graduated tape spring wound therein. The tape includes an attachment for securing the bob to certain areas of a device frame.

7 Claims, 12 Drawing Figures

ASSEMBLY, TESTING AND REPAIR UNIVERSAL STAND FOR MOTOR VEHICLES

This is a division, of application Ser. No. 227,093, filed Nov. 26, 1980 now Pat. No. 4,447,961.

This invention concerns a "Universal bench for the assembly, testing and repair of motor vehicles".

TECHNICAL AREA

When a vehicle receives damage that affects or may affect its coachwork or chassis, and especially its basic geometry—i.e. those essential points on whose dimensional accuracy the behaviour and safety of the vehicle depends (generally, the points where the mechanical elements are assembled to the body or chassis, or guide marks deliberately placed by the manufacturer at certain places), it is usually repaired with the help of a bench, which serves as a support, and often also as a reference base for a device for dimensional checking, either by:

the method known as "positive check", by which a set of brackets, specific to the vehicle model in question, fixes in space the shape and position of the essential check points that constitute its original geometry, or by the so-called "measurement" method, by which with the help of various procedures (mechanical, optical, electro-optical, etc.) the dimensions measured on the vehicle are compared with the corresponding "original" dimensions, which are generally given in a specific list for the vehicle in question.

The Previous Technique

Under the previous technique, not only were the benches only exceptionally sufficiently rigid to provide adequate precision in the measurements or checks carried out, and especially in view of the state of the floor of the workshop (for benches used "at floor level"), or of the play in the operation of the lifting mechanism (for the so-called "lifting benches"), but also the manufacturers bored their positioning holes not in accordance with a universal law, but haphazardly and with successive changes that led to arbitrary drilling plans. Such positioning of the holes ruled out any possibility of compatibility between the existing devices, tools or appliances. The recent appearance of so-called "universal" cross members —but whose dimensions and hole positions also varied from one manufacturer to another—has not solved the problem at all, and has also involved a high additional expense and awkward handling operations for th user. Such incompatibility, though in practice it protected the manufacturer, considerably inconvenienced the repairer, and consequently led to extended out-of-action times and higher costs that were prejudicial to the general interest.

With regard in particular to the appliances and devices using the so-called "measurement" method:

not only did these only exceptionally permit the repairer to follow up the progress of the work, as the operations of straightening up the damaged parts proceeded;

and not only were they bulky, requiring care and precautions both in use and in storage; for example, also, they could not be moved easily to enable the assessor to check on the conformity of the work to specification and on its results;

but also their design was exceedingly complex, involving delicate equipment. The consequence of this was that:

they were of an overall fragility that was inappropriate to the work conditions that usually apply in body-repair shops;

they could only be used by highly-qualified staff who were particularly conscientious;

they were expensive, and their diffusion was consequently restricted; this helped to increase the cost, which everyone deplores, of car repairs.

It would therefore be an advantage to have an appliance:

of sufficient rigidity for the necessary dimensional checks to be carried out with precision;

such that the same equipment can used indiscriminately "on the floor" or as a "lifting bench";

that would permit the use of accessories and tools of various different origins that can easily be obtained locally by purchase, lease, loan or on any other basis, and would enable them to be handled conveniently;

that would facilitate the adaptation of measuring apparatus of:

great simplicity:

in design and manufacture, making possible:

robust construction, compatible with the occasionally primitive conditions obtaining in body-repair shops, which in practice are fairly far removed from those met with in measuring laboratories:

a price sufficiently low to permit wide distribution, and in particular to small artisanal-scale firms;

in use:

bringing it within the scope of staff of average qualification in the trade, on the one hand;

and making possible significant reductions in operating time, and consequently substantial economies, on the other hand.

an easily portable nature, so that it can be used without difficulty at different points on the same vehicle, on several vehicles in the same shop, or even transported without risk to different places of work, that may be remote from each other.

DESCRIPTION OF THE INVENTION

In consequence of the above, the present invention has as its precise object an appliance that can fulfill the various needs mentioned and provide an answer to the disadvantages referred to.

The first and a most important object of the invention is to obtain a very rigid bench, particularly in resisting torsion, so as to maintain an extremely flat working surface and to provide a valid reference basis for the measurements or checks, whatever the method or equipment used for these measurements or checks.

The structure of the frame (FIG. 1, No. 1) has thus been designed as a true integral prismatic box, formed by assembly of 2 longitudinal beams 1a and 2 main surfaces 1b, 1c, reinforced by transverse bulkheads 1e.

The two longitudinal beams 1a are thick steel sections joined together by reinforcement bulkheads 1e sufficient in number, the first and last forming the ends of the frame 1.

The two main surfaces, formed of continuous steel plate 1b, 1c of suitable thickness to stand up without distorsion to the stresses, which are sometimes large, applied during the operations of straightening the vehicles body or chassis; they have open spaces 1d between the reinforcement bulkheads 1e whose purpose is firstly to lighten the bench in zones that are not frequently used for fixing measurement or checking equipment, and secondly to provide good access to the inside of the frame and the underside of the vehicle.

The dimensions of the frame are such that not only the bodies and chassis of the most common private cars or commercial vans, or the cabs of trucks, can be handled, but also their longer variants, such as "limousines", station wagons or light utilities, without recourse to awkward and inaccurate extension pieces.

Its shape renders the frame suitable not only for use on the floor, when fitted with legs or casters, but also as a lifting bench; furthermore, when necessary it can be rapidly adapted from one of these two forms to the other.

A second important object of the invention is to obtain a very versatile bench, capable of being fitted with tools and equipment of varying origins, and in particular the recent equipment introduced by certain vehicle manufacturers. It is for this reason that the frame proper:

firstly, has a simple arrangement to permit it to be turned over by tipping it around its longitudinal axis, so that either one of its main work surfaces 1b, 1c can be used. This arrangement (FIG. 1, No. 5) consists of a hole in the centre of each of the end cross members 1e of the frame, behind which is welded a nut designed to take a removable pivoting shaft 5a, 5b. Using a high-lift garage trolley jack and a set of stands (or alternatively two jacks, or any other similar equipment) the bench can easily and rapidly be turned over.

is drilled according to an original system, in which:
the two main work surfaces 1b, 1c can have different drilling plans 1e, one on the modern square-grid pattern, and the other, for example, on the "old" (or "classical" or "traditional") pattern, which is still being used though in the course of being abandoned.
the two side beams 1a are also drilled on the modular square-grid pattern.

This double arrangement offers amoung its advantages the possibility of combining and adding to the facilities of two procedures used under the old system for fixing hardware or cross pieces for checking purposes, but which were mutually exclusive: on the upper surface (France, Great Britain) or on the sides of the beams (Italy).

and lastly, is fitted with auxiliary devices whose purpose is to increase further its flexibility in use; the most important of these are shown on the attached drawings.

The principle one of these is an original system of multipurpose angle brackets 2a-2e which is also one of the special characteristics of the invention:

The structure of these brackets—shown on the attached drawings—has two perpendicular surfaces 2f, 2g reinforced by two triangular and parallel shoulder plates 2h.

One of the two surfaces is drilled with 4 and the other with 6 holes 2i, on a square-grid modular basis identical with that of the main frame; these holes are so placed that one surface of the bracket—which is fixed by the other surface to the side of the frame—is exactly flush with the main surface, the side or end of the frame, as the case may be (see FIG. 1).

There are large-diameter holes 2i on each surface in the centre of each drilling grid, to permit the passage of a shaft, adjustment screw, etc. (see example, FIG. 3).

The gap between the two reinforcing shoulders has two zones with surfaces a precise distance apart, drilled with holes 2m, 2k through which can be passed pins or bolts, for the fixing of various accessories such as, for example, a nut (FIG. 3) or an aligning bar (FIGS. 1, 3 and 4).

Lastly, the bracket is completed, on the inside of its angled surfaces, by identical, interchangeable and removable plates 2p carrying caged nuts 4c, which can themselves be exchanged if necessary (FIG. 2).

Some of the numerous uses of these angle brackets are shown, as an illustration without limitation, on FIG. 1. But they can carry out many other functions, for example, as:

removable supports for removable roll-plates, by which the vehicle can be very quickly slid onto the bench;

means of fixing an axle for road transport;

and in general, as means for adding any auxiliary device for fixing, holding, moving, checking, or repairing, etc.

Another of the auxiliary devices is in the form of spacers 3 of standard thickness (FIG. 5), which are more or less prismatic blocks, drilled right through with:

four holes 3c at the corners of the square grid described above (modular drilling of the frame and brackets);

a large-diameter centre hole 3d, which not only lightens them and saves material, but also allows a shaft or adjusting screw, etc. to be passed through.

The dimensions of these spacers are such as to permit, in particular:

their introduction on the inside of the frame, to make a flush fit on the internal wall of the side members, the positioning of the angle brackets in such a way as to reconstitute the drilling module, in applications such as that illustrated in FIG. 1, No. 3a).

These spacers can also be used in numerous ways when it is necessary to maintain a fixed gap between two elements of the bench. One of these uses, in no way limitative, is to provide a suitable working height when the bench is mounted on wheels or feet (FIG. 1, No. 3b).

Another auxiliary device is a new system of light back plates 4 fitted with caged nuts 4a on the square modular pattern. The two versions shown, without limitation, in FIGS. 6 and 7 have an identical transverse section, and only differ by their width and the number of nuts 4a. These are cheap and can be rapidly replaced if necessary.

These back plates avoid the disadvantages of the three systems previously used in the old technique, which consisted of:

either using separate nuts which, when they did not get lost, needed one of the operator's hands to hold them, often in places difficult of access, or welding inside the bench a large number of nuts, leading to high manufacturing costs, threads that were often not in line with the drilling axis, or were dirty or rusty (especially if they were not often used) and causing serious difficulties of replacement, etc.

or again directly tapping the working surfaces, which gave threads of small diameter and short length which were consequently unsuitable for taking large stresses, and also caused considerable difficulty if repair was necessary.

In order to facilitate or accelerate further the fixing of the brackets 4 or various pieces of hardware onto the bench—and this is very important for complying with repair-time standards—these back plates can be made self-adhesive, for example by including in them small permanent magnets 4b that can hold them in place during tightening, while allowing them to be slid slightly for correct centreing.

A third important object of the invention is to use the square grid of the modular drilling on at least one of the main surfaces of the bench, with possible extension by the angle brackets, to make a simple device by which the position in space of a point on the vehicle to be checked can be easily and precisely verified, by measurement of its coordinates in the three dimensions.

This object is attained by determing:

the coordinates of the projection of the point in question onto a horizontal reference plane (length, width) on the one hand;

and on the other, the vertical distance of the point in question from the projection plane (height).

In particular:

by using as a horizontal reference plane the top surface of the universal bench already mentioned, and its modular drilling pattern of a square grid, and by making an extensible gauge by which:

the point to be checked can be projected vertically onto the horizontal reference plane, and the height of the point to be checked can be read off directly.

It is for this reason that an original device has been planned, consisting of three main elements:

at least one projection plate 7, the purpose of which is to subdivide the modular grid on the bench forming the horizontal projection plane, in the zone in question.

at least one weighted extensible gauge 8,9, the purpose of which is to give a vertical projection of the point to be checked, using the combined properties of the plumbline and the measuring tape.

one or more devices 20 to 25 for suspending the gauge suitable for the parts of the vehicle to be checked.

The extensible gauge consists essentially of a graduated metal tape 8 and a hollow plumb 9 which contains the graduated tape and its compensating spring 14 when the tape is rolled up, with a weighted point 12 at the bottom.

In order to facilitate use of the device, there is an arrangement 14,18 on the hollow plumb 9 for adjusting the compensating spring 14, and for locking the graduated tape.

Movable pointers also offer, when necessary, easier reading on the projection plate and the vertical graduated tape.

A system of adjustable clips 20 to 25 lastly permits the extensible gauge to be hung in a way to provide accurate measurement, despite the great variety of the elements to be checked on the vehicle: holes, bolt heads, etc.

It was necessary to provide the horizontal projection plate 7 with a more accurate dimensional subdivision than that formed by the modular drilling pattern on the bench, that could in particular be read to a degree of precision greater than the dimensional tolerances normally acceptable in car bodywork.

The so-called "projection" plates (FIG; 8, No. 7) therefore have on their upper surfaces a millimetric grid graduation (or any other form of graduation offering a similar degree of reading accuracy, for use for example in countries where the metric system is not in use), by which the position, in length and width, of the projection of the points to be checked can be directly read off.

These projection plates 7 are of constant low thickness, and their external dimensions are such as to permit several of them to be exactly juxtaposed, for example if it is desired to have a larger reading surface for simultaneous rapid checking of several points on the vehicle.

There are feet underneath the plate 7 on a pattern corresponding to that of the holes in the bench; they fit without appreicable play into these holes, thus accurately positioning the plate on the bench, i.e. on the frame and/or the angle brackets with which the reference surface can be extended if necessary (this is shown in FIG. 8).

It was also necessary to project the point to be checked in a vertical direction.

This is why the extensible gauge should for preference have a tape 8 made of a flexible but inextensible material (FIG. 8, No. 8), the top of which has a linking piece 10 of sufficiently low friction to ensure that the whole of the gauge is exactly vertical.

It is also why this extensible gauge has, at the bottom of the tape 8, a mass 9, of generally cylindro-concial shape suggesting the universally-known silhouette of the classical plumbline, the lower part of which serves as a weight for the whole extensible gauge. This lower part 12 ends in an axial point of an angle sharp enough to position the projection of the point to be checked accurately on the square-ruled projection plate 7.

It was lastly necessary to be able to read off the vertical distance (or height) of the point to be checked over the reference plane.

Consequently the tape 8 of the extensible gauge has a millimetric graduation (or any other graduation giving read-off accuracy of the same order).

The main body (FIG. 9, No. 11) of the hollow plumb is so designed as to be able to contain, not only the weighted point 12 described above, but also:

when it is not in use, the graduated tape 8 rolled up like a classical tape measure, but in such a way that the centre of gravity of the plumb does not change laterally with different amounts of tape wound up inside the main body. This result is obtained by providing a vertical exit 16 for the tape 8 in the axis of the plumb 9.

a device 14 for compensating the whole tape 8, for instance in the form of a spiral spring (FIG. 9, No. 14) of a conventional type; the tension on this spring 14 can be adjusted 15 to ensure that the plumb neither tends to rise not to fall.

on the tip, the slit 16 out of which the graduated tape 8 emerges is curved in such a way as to ensure that the tape comes out in the axis of the plumb 9, with the consequence that the plumbline is exactly vertical. At its ends this slit 16 has a pointer 17 to permit the length of tape 8 in service to be read off with precision. In order to make the extensible gauge easier to use, in particular during operations of straightening the body chassis, a tape locking device 18,19 could be provided.

In order to make it easier to read off any differences between the dimensions it is hoped to find—i.e. the original ones, whether these are taken from a part of the vehicle that is not damaged, or given on dimensional charts prepared for each type of vehicle from the dimensions published by the manufacturer—and those actually found on the part to be checked, it can be an advantage to provide movable pointers of suitable shape and colour that visualize the original values:

firstly, on the projection plate 7 (length and width) by any appropriate means (adhesion, magnetic attraction or otherwise);

and secondly, on the graduated tape of the extensible gauge (height) by any appropriate means (pinching, adhesion, magnetic attraction or otherwise).

The repair work to be undertaken (for instance, straightening) can thus be determined immediately and precisely, both in direction and value.

Fixing the top end of the extensible gauge onto the points of the vehicle to be checked is usually rendered difficult:

firstly by the fact that the check must be possible whether the mechanical elements of the vehicle (front and rear axles, engine unit, etc. . .) are in place or not ("bare" coachwork).

and secondly because of the extreme diversity of nature, form and dimensions found in practice on the elements of the points to be checked.

The latter generally take the form of:
holes, usually smooth but sometimes threaded,
bolt heads or screws, of widely varying dimensions.

It is thus necessary to have a device:
which is adaptable to these different cases,
which is not bulky
which is simple and quick to use,
and on which the extensible gauge can be hung in the immediate vicinity of the check point indicated by the manufacturer.

This is the purpose of the device shown in its two versions, in FIGS. 11 and 12 attached.

In both versions, a screw 21, with knurled head so that it can be easily turned by hand, controls the opening and closing of claws 22 articulated inside a nut 23 that is itself knurled, with a central opening on one of its faces and radial slots to take the claws and permit their controlled movement, either:

directly, by turning the end of the knurled screw 21, for fixing inside a hole by spreading out the claws 22 (FIG. 11);

or by turning the screw 21, for fixing onto a bolt or another nut, by tightening the claws 22 onto it.

An open ring 20 pivots in the head of the knurled screw 21, it being held there, for example though without limitation, by an annular groove and a clip 26 (or an annular elastic clip), in such a way that the extensible gauge hangs perfectly vertically.

In the much rare cases where the point to be checked takes a form other than those considered above, the adjustable open ring 20 could be linked to a suitably-shaped permanent magnet without this adaptation falling outside the scope of the invention.

The extremely simple design, manufacture and method of use of this measurement device puts it on quite a different plane from the solutions used in the preceding technique. It consequently makes it possible to obtain, at an extremely low cost, immediate and highly accurate results, while retaining the advantages of compactness and robustness that allow it to be used by staff of quite ordinary qualification.

Furthermore, because any number of basic units (extensible gauge + projection plate + suspension clips) can be employed, the device can now be used by the assessor during his various assignments; it can also be introduced into shops of small size (of an artisanal nature, for instance), that previously could not obtain access to the bulky, complex, fragile and expensive equipment required for the previous technique; these shops can now progressively extend their equipment by acquiring new basic units, as their activity and resources develop.

The same figure shows one of the ways of making the angle brackets: by casting (with extra thickness, holes for lightening, etc.). Obviously, any other method—for instance by mechanical and welding assembly—remains covered by the invention.

Figure 3:
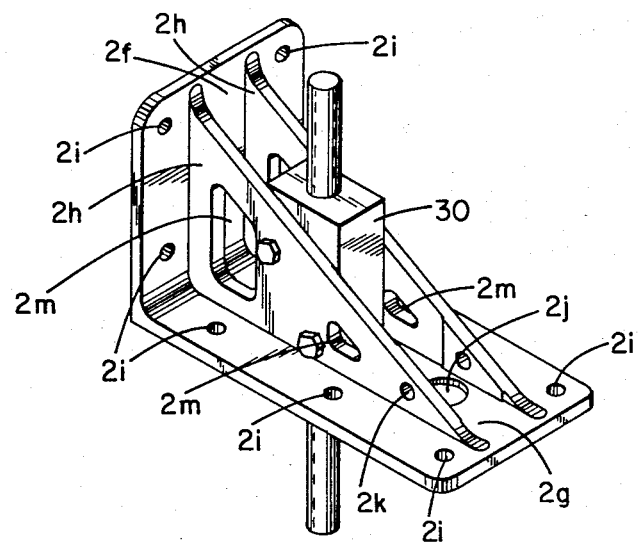
Figure 4:
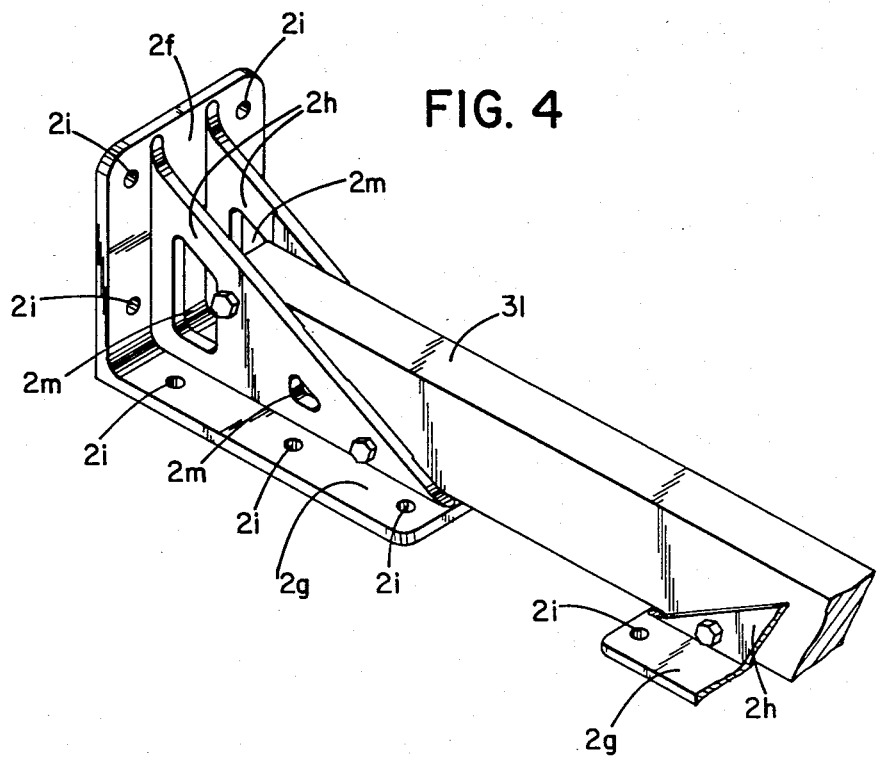

FIGS. 3 and 4 are perspective views that illustrate two examples among many of auxiliary devices that can be fitted to the angle brackets, using the 2 assembly zones between the reinforcing shoulders 2h:
an adjusting nut 30 (for example of the height of a wheel)=FIG. 3.
an alignment bar 31 between two brackets mounted opposite one another=FIG. 4.

Figure 1:
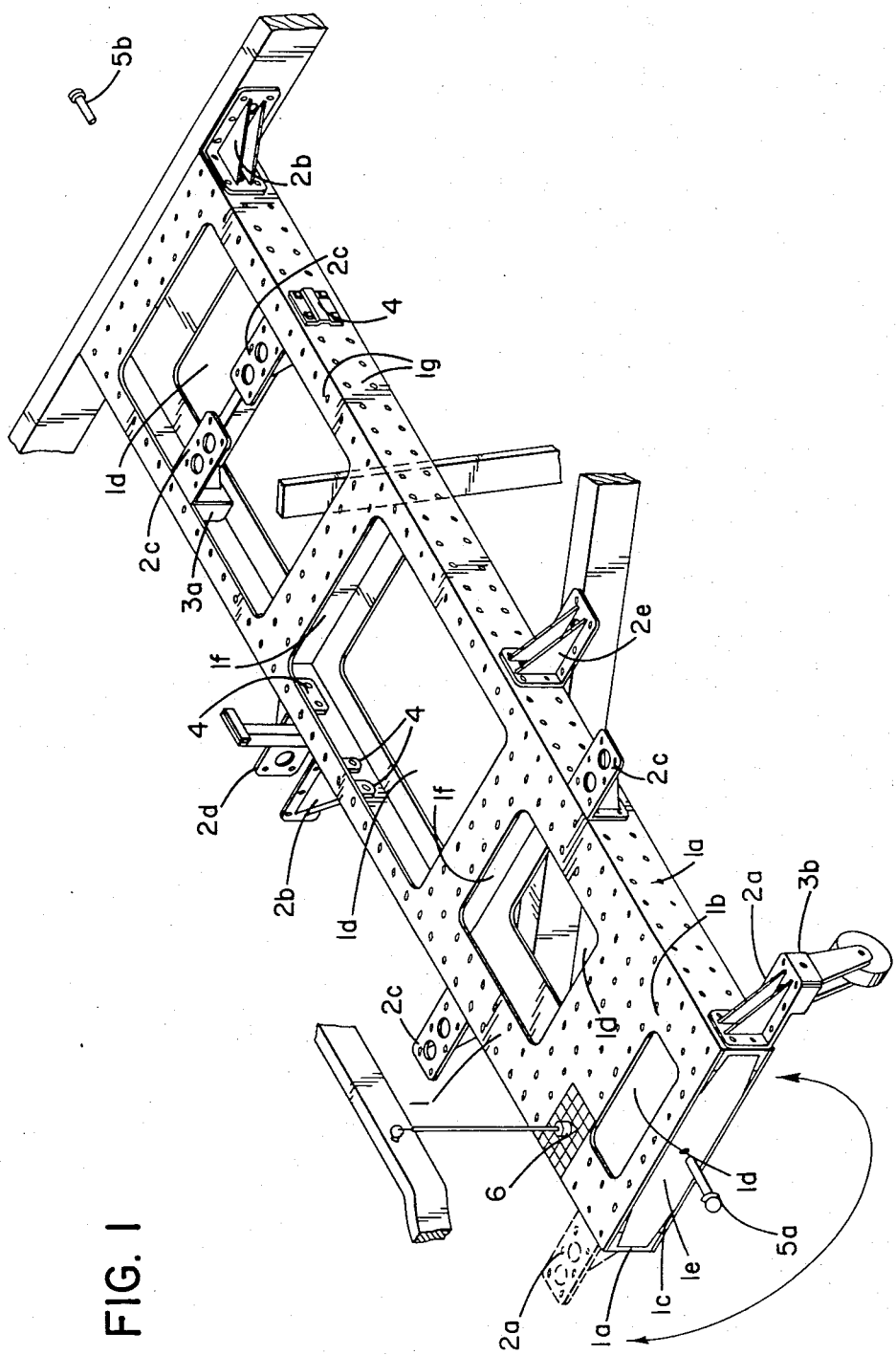
FIG. 1 is a perspective view of the whole bench covered by the invention, on which can be seen:
the frame (No. 1)
the multi-purpose angle brackets (No. 2), for which some of the numerous possible uses are shown, as examples without limitation:
as supports for legs or casters (No. 2a)
as means for fixing to the cross member of a lift (No. 2b)
as extensions of the modular drilling pattern on the frame, either outwards or inwards (No. 2c), and in a similar manner as supports for removable roll-plates (not shown)
as supports for anchoring clamps (No. 2d)
as elements for anchoring the straightening or drawing equipment (No. 2e) and, with the same arrangement, for fitting an axle for road transport (not shown)
the spacers (No. 3), with two of their possible uses:
to space out the drilling module of the work surface inwards (No. 3a)
to give a more convenient work height for certain jobs (No. 3b)
the back plates with caged nuts (No. 4), shown in various positions
the pivoting arrangements (No. 5) shown, without limitation, in two of their possible uses: either on the floor (No. 5a) or in association with a lift (No. 5b)
the measuring device (6) which is detailed in FIGS. 8 to 12.
Figure 5:
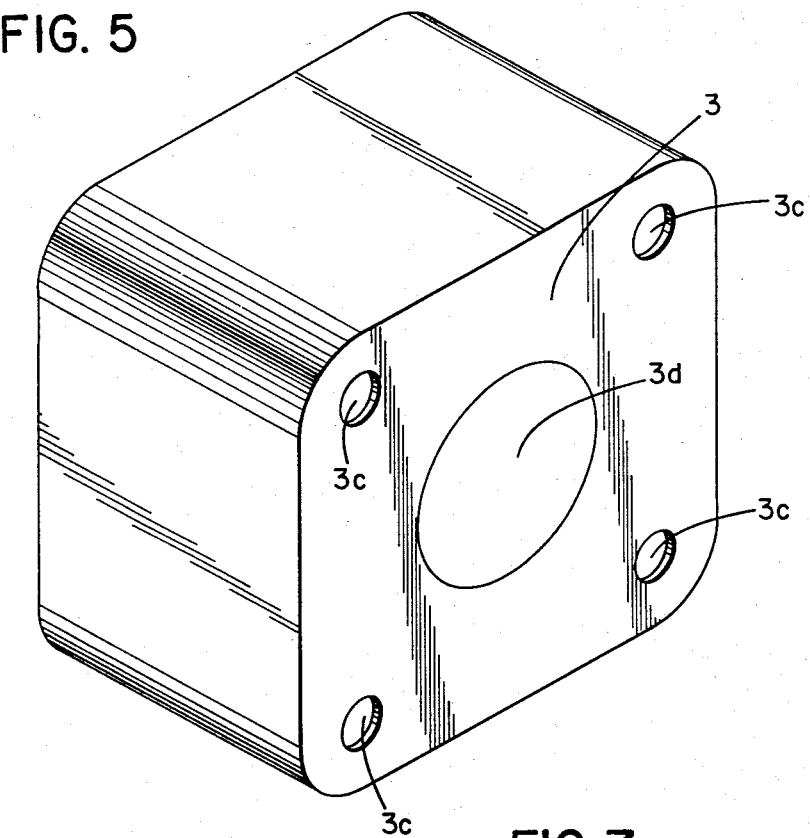

FIG. 5 is a perspective view of the spacer 3 already shown in FIG. 1 (No. 3).

Figure 7:
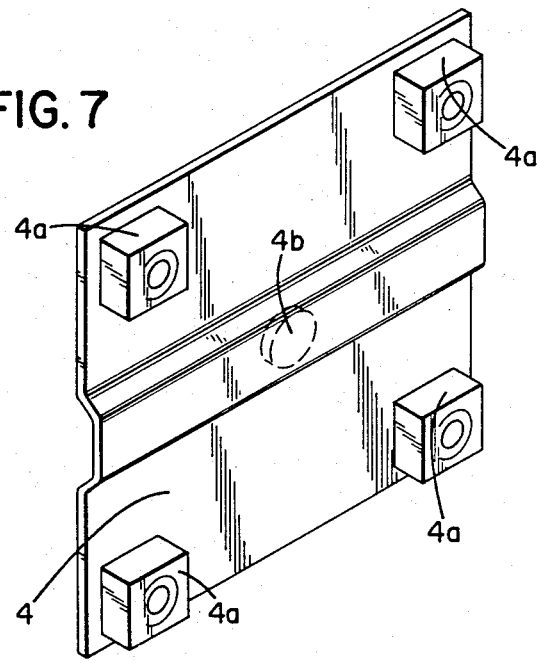
Figure 6:
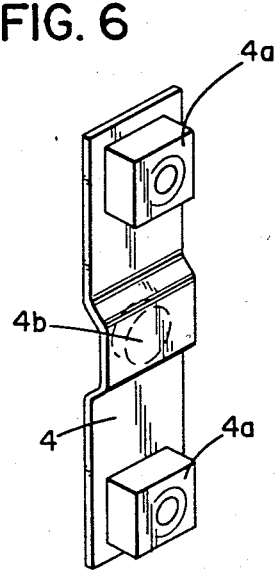

FIGS. 6 and 7 are perspective views of back plates 4 with caged nuts 4a, already shown in FIG. 1 (No. 4).

For illustration only, an indication has been given in dotted lines of the possibility of including small permanent magnets 4b—of whatever shape—in the back plates 4.

Figure 8:
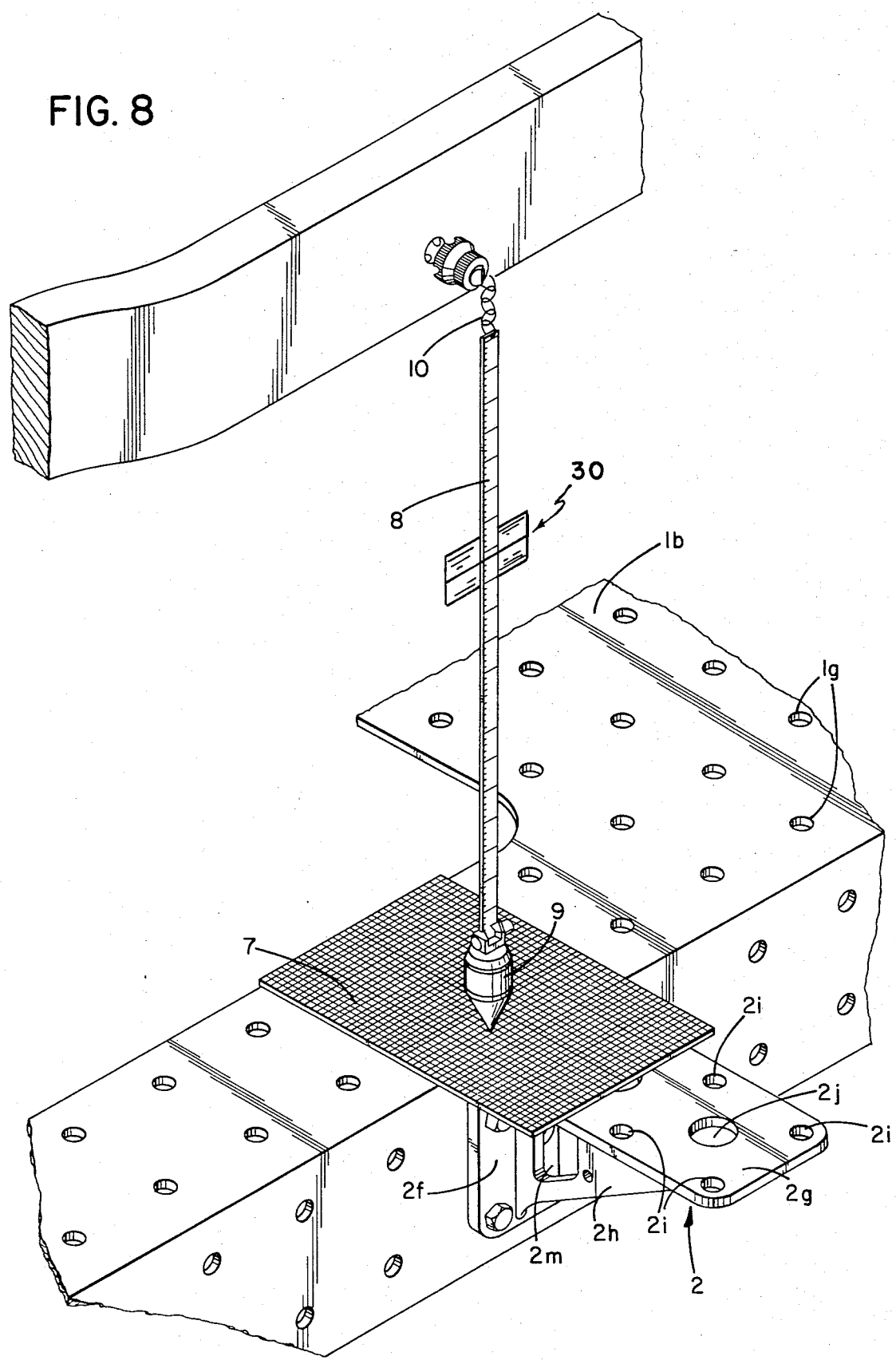

FIG. 8 is a perspective view of the whole measuring device using the modular square grid on the bench, as illustrated in FIG. 1, No. 6. FIG. 8 is a detail of this on a larger scale. It shows:
   the projection plate (No. 7) centered in the holes of the frame and/or of the angle brackets (as shown);
   the extensible gauge with its graduated tape (No. 8) and its hollow plumb at the bottom (No. 9);
   the suspension arrangement (No. 10).

Figure 9:
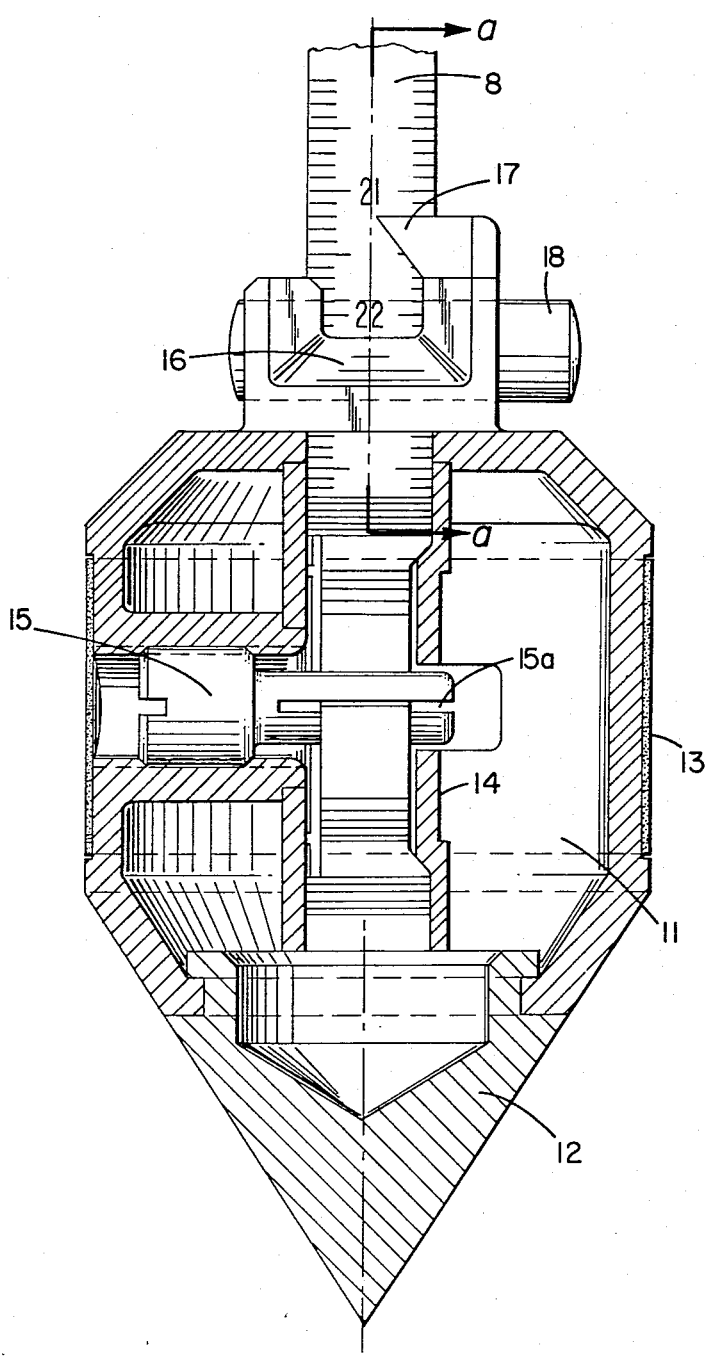

FIG. 9 is a section of the bottom mass of the extensible gauge, showing its internal layout, in the form described below, which is in no way limitative:
   the graduated tape (No. 8)
   the weighted point (No. 12)
   the main hollow body (No. 11)
   the elastic tightening ring (No. 13)
   the spiral compensating spring (No. 14)
   the pin for adjusting the tension of the compensating spring (No. 15)
   the slit out of which the tape emerges (No. 16), with:
      the fixed pointer (No. 17)
      the device for locking the tape 8 with its press-button (No. 18) and the bulge (No. 19) with which the tape is held against the side of its exit slit.

Figure 10:
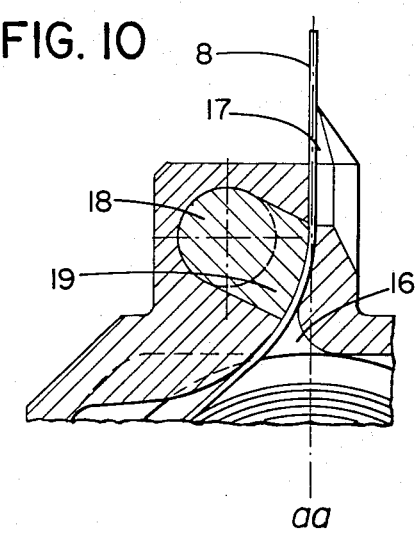

FIG. 10 is a partial section intended to illustrate, without limitation, one of the ways in which the tape-exit slot can be made.

Figure 11:
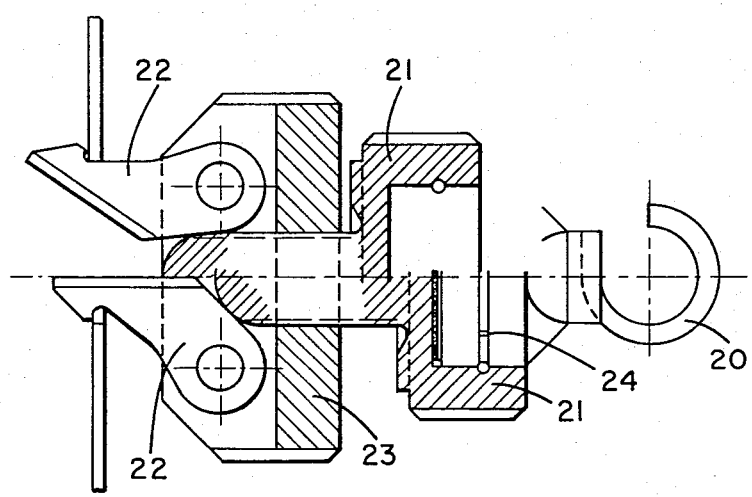
Figure 12:
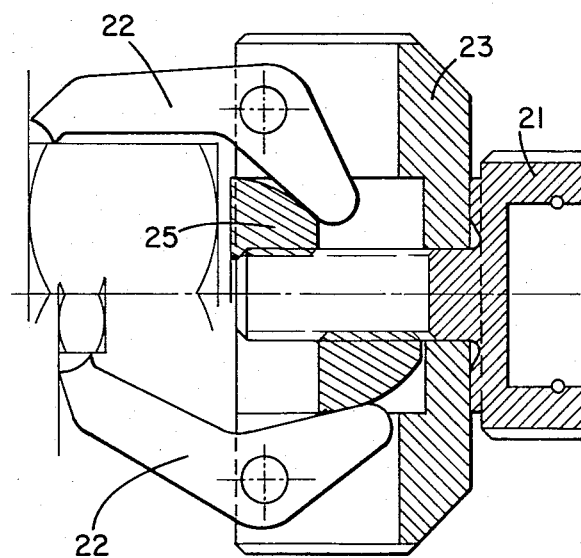

FIGS. 11 and 12 are sections illustrating one way of making the adjustable claws for attaching the extensible gauge to the part of the vehicle to be checked. These figures have been drawn:
   in section, in order to illustrate the operating principle
   in their extreme use dimensions:
      FIG. 11: holes of lowest current diameter (bottom of the figure) and the greatest diameter (top part)
      FIG. 12: hexagonal nuts of current widths over flats: the lowest at the bottom and the greatest at the top.
   Shown here are:
      the open ring (FIG. 11, No. 20), which is movable, and which is intended to take, using a few links of chain or any other means offering negible friction, the top end of the extensible gauge
      the knurled screw (No. 21), for controlling the claws (No. 22)
      the knurled nut that carries the claws (No. 23)
      the device (retaining ring, clip, etc.) for maintaining (No. 24) the open ring (No. 20) in place
      in the case of attachment to a bolt head or nut (FIG. 12), the backing nut (No. 25) whose movement relating to the knurled screw (No. 21) adjusts the claws (No. 22).

The best way of manufacturing the invention

The frame (No. 1) can be made by casting. However, and chiefly for weight reasons, it is better to assemble it from thick plate, by welding.

The principal surfaces are in the case made of continuous steel sheet 1b, 1c with openings 1d cut by flame.

For the side members, rather than current extrusions obtained by rolling, U-folding of thick sheet is to be preferred. This method not only gives tighter dimensional tolerances than those obtainable with commercial extrusions, but also gives greater wall thickness in the dimensions under consideration than current rolled sections.

The reinforcing cross bulkheads 1e, are closer together in the zones subject to large or frequent stresses.

The pivoting arrangements (No. 5) vary according to the way the bench is used: with a 4-post, lift, a simple bolt (No. 5b), slightly loosened during pivoting, is sufficient; for use on the ground, a steel shaft (No. 5a) sufficiently long to clear the feet of a stand when used, is suitable. In some cases, standard caravan-towing balls can be used.

For the modular drilling of the frame (and the angle-brackets) a grid with 100 mm between centres is perfectly suitable.

Figure 2:
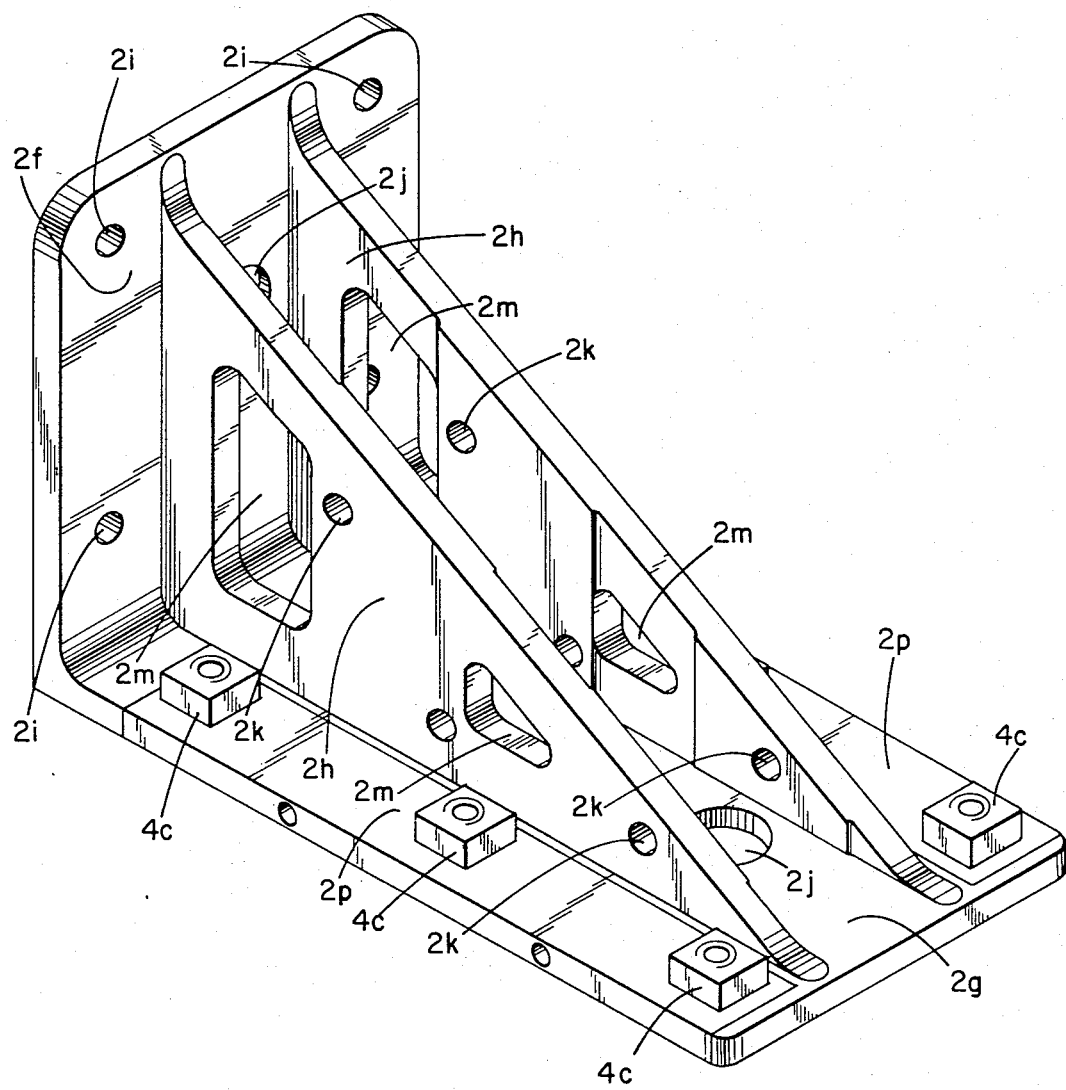
FIG. 2 is a perspective view of an angle bracket, showing the two faces 2f, 2g and the two reinforcement shoulders 2h, and also (No. 2p) one of the possible uses for the back plates with caged nuts 4c.

The angle-brackets (No. 2) which are themselves also in steel, can be made, depending on the numbers required and the resources available, either by casting (as illustrated in FIG. 2, which shows the openings 2m for lightening the reinforcing shoulders and the machining allowances in the assembly zones) or, and more usually, by mechanical assembly and welding. In the latter case, the two faces 2f, 2g conveniently be obtained by folding a flat extrusion.

There is no difficulty in making the back plates 4 and caged-nut 4a, 4c recesses. They can be fixed on the angle brackets 2, as shown in FIG. 2, either on the outside edge of the face in question—especially for cast brackets—or by any other suitable procedures (screws, plastic rivets, etc.). In most cases however, magnetic fixation is preferable, and in particular in the form of sections of magnetized tape of suitable dimensions, which are readily available and are often self-adhesive.

The spacers (No. 3) can be conveniently made in aluminium, which is incompressible but light enough to facilitate handling. However, in view of the cost of this material, cheaper solutions may be preferred in the future.

The extensible gauge (N) 8 and 9) of the measuring device uses numerous current elements of low cost (graduated tape, compensating spring). The main body (No. 11) can be conveniently made in two half-mouldings of clear plastic (for instance fluorescent yellow), so that it remains visible even in the usual poor lighting conditions (underneath vehicles, in shops that are sometimes dark, etc.). The half-mouldings are joined together by one or several screws and/or an open elastic ring, as indicated (FIG. 9 No. 13) and have on their upper part the reading window and fixed pointer (No. 17), painted a colour, red for example, which contrasts with their environment (the tape, the body of the plumb, etc.). The tension of the spring is adjusted by means of a threaded rod (No. 15), on the end of which is a slot 15a in which the end of the spiral spring 14 engages; when this rod is turned with a screwdriver, the tension on the sping is increased or reduced.

The projection plate (No. 7) is formed of a rectangle of steel or light-alloy sheet, on which is printed by photogravure a square grid, and which has four centreing feet which engage in the modular drilling pattern of the bench.

Making the suspension claws (FIGS. 11 and 12) does not call for any particular comment, except that the parts subject to stress or wear (the jaws and surfaces in contact or movement) should be given a suitable heat or thermo-chemical treatment.

Use

This universal bench, the subject of the invention, is mainly intended for the checking and repair of motor-vehicle bodies and chassis, and also certain of their mechanical elements, especially after collision—whether the dimensional checks are undertaken by the "Positive check" method, using sets of jigs, or by measuring apparatus of varying origins. Its precision and rigidity enable all operations of straightening and replacement of elements ("restructuring") to be carried out. It can be associated with numerous fixed or mobile pulling elements, including of North American origin.

The original measurement device fitted to it is intended for use not only by body repairers before (diagnosis), during (continuous follow-up of the straightening operations, fitting of new parts) and after the repair (checking), but also, thanks to its small size which makes it easily portable, by the assessors during their assignments of damage evaluation and choice of operating methods.

Furthermore, the very principle of measuring the coordinates of the points to be checked lends itself very directly to use for teaching purposes, in particular because to its direct relation, both with the classical principles of descriptive and dimensional geometry, of which it constitutes a simple and concrete form of application, and also with the procedures of bodywork measurement used for vehicle-manufacturer designs.

But this bench, whether or not equipped with its measuring device, is also particularly suitable for use in the assembly or checking of vehicles in small or medium series. In such an application it is well suited to the assembly of variants derived from a basic model (a utility vehicle, or a sports or prestige car, for example), and also to that of vehicles sent abroad in the form of separate ("K D") elements. When the run is sufficiently long, this univeral bench can be integrated in any assembly line, and associated with any appropriate handling gear: rolling at ground level, suspension, lifting, horizontal pivoting, tipping, etc.

I claim:

1. A measuring device for three-dimensional checking of a vehicle comprising:
   (a) attaching means (20–25) for suspending said measuring device to chosen parts of the vehicle to be checked,
   (b) a vertical measuring tape (8) with
      graduations and
      a linking piece (10) fixed to the upper end of the measuring tape, and adapted to be coupled to said attaching means (20), said linking piece being of sufficiently low friction in regard to the attaching means so as to ensure that the whole of the tape is exactly vertical,
   (c) a bottom means (9) of roughly cylindroconical shape with a vertical axis, including
      a hollow main body (11), with
      a bottom point (12), serving as a weight,
      a compensating spring (14) for the measuring tape is contained in a spiral wind, in said hollow body when it is not in use,
      an exit slot (16) out of which the tape (8) emerges in the axis of said bottom means (9), and
      a pointer (17) allowing the length of tape (8) out of said hollow body to be read off.

2. A measuring device according to claim 1 wherein said hollow main body (11) comprises adjusting means (15) for controlling the tension of the compensating spring (14), said adjusting means comprising a threaded element (15) in the end of which is provided a slot (15a) engaging the end of the spring (14) and which when rotated one way or the other increases or reduces the tension in said spring so that the tension of the spring ensures that the bottom mass neither tends to rise nor fall.

3. A measuring device according to claim 1 wherein said hollow main body (11) comprises means (18, 19) for locking the graduated measuring tape, said locking means (18, 19) for locking the graduated measuring tape, said locking means comprises, in the top of the main body, a pressbutton (18) with an embossed part (19) which when actuated locks the tape (8) against the side of its exit slot (16).

4. A measuring device according to claim 1 further comprising at least one movable pointer fixed to the graduated measuring (8), said pointer indicating visually on said graduated tape, the proper height of the point to be checked.

5. A measuring device according to claim 1 wherein said attaching means comprises claws (22) adjustable symmetrically about an axis, thus allowing to attach said claws in holes of various diameters or to nuts or bolt heads provided on the vehicle.

6. A measuring device according to claim 1 further comprising in combination, a frame (1) having two main faces and at least one plate (7) having a square grid pattern mark, said plate being located on one of the two main faces of the frame (1), whereby the bottom point (12) of said mass (9) disposed in regard of the plate (7) allows to determine a position in the plan of said square grid pattern marked plate.

7. A measuring device accoring to claim 6 wherein said main face of the frame (1) is provided with a grid drilling (1g) and said square grid pattern maked plate (7) is provided with at least two feet allowing said plate (7) to be accurately located in the holes (1g) of the frame (1).

* * * * *

UNITED STATES PATENT AND TRADEMARK OFFICE
CERTIFICATE OF CORRECTION

PATENT NO. : 4,489,500
DATED : December 25, 1984
INVENTOR(S) : CLAUDE R. VALAT

It is certified that error appears in the above-identified patent and that said Letters Patent is hereby corrected as shown below:

Title page, Item /86/ should be added to read as follows:

-- PCT Filed: March 26, 1980

PCT No.: PCT/FR80/00045

§371 Date: November 26, 1980

§102(e) Date: November 26, 1980

PCT Pub. No.: WO 80/01998

PCT Pub. Date: October 2, 1980 --.

Item /30/ should read as follows:
-- Foreign Application Priority Data

March 26, 1979 [FR] France 79/07506

August 24, 1979 [FR] France 79/21327 --.

Signed and Sealed this

Tenth Day of December 1985

[SEAL]

Attest:

DONALD J. QUIGG

Attesting Officer     Commissioner of Patents and Trademarks